United States Patent [19]

Menioux

[11] 4,437,441
[45] Mar. 20, 1984

[54] ROTARY ALTERNATING PISTON GAS GENERATOR

[75] Inventor: Claude C. F. Menioux, Nogent sur Marne, France

[73] Assignee: Societe Nationale d'Etude et de Construction de Moteurs d'Aviation "S.N.E.C.M.A.", Paris, France

[21] Appl. No.: 231,105

[22] Filed: Feb. 3, 1981

[30] Foreign Application Priority Data

Feb. 6, 1980 [FR] France .................. 80 02540

[51] Int. Cl.³ ............................................. F02B 53/08
[52] U.S. Cl. ................................... 123/213; 123/245; 418/36
[58] Field of Search ............. 123/212, 213, 214, 18 A, 123/245; 418/36

[56] References Cited

U.S. PATENT DOCUMENTS

| | | | |
|---|---|---|---|
| 1,568,053 | 1/1926 | Bullington | 418/36 X |
| 1,647,758 | 11/1927 | Sweet | 123/214 |
| 1,676,211 | 7/1928 | Bullington | 418/36 |
| 1,889,508 | 11/1932 | Zens | 418/36 |
| 2,075,654 | 3/1937 | Martin . | |
| 2,155,249 | 4/1939 | Bancroft | 123/234 X |
| 2,349,848 | 5/1944 | Davids . | |
| 2,993,482 | 7/1961 | Froede | 123/213 |
| 3,312,200 | 4/1967 | Benson | 123/234 |
| 3,807,168 | 4/1974 | Bachmann . | |

FOREIGN PATENT DOCUMENTS

| | | |
|---|---|---|
| 861936 | 4/1978 | Belgium . |
| 1075381 | 2/1960 | Fed. Rep. of Germany . |
| 682429 | 5/1930 | France . |
| 436166 | 5/1974 | U.S.S.R. ............................ 123/213 |

*Primary Examiner*—Michael Koczo
*Attorney, Agent, or Firm*—Oblon, Fisher, Spivak, McClelland & Maier

[57] ABSTRACT

A variable volume gas generator for charging a self-contained power turbine having heat engines for generating hot compressed gases including a first and second module each forming motor for the production of the hot compressed gases, a third module connected to the first and second modules and which forms an air compressor to charge the heat engines, the modules comprising a fixed housing delimiting an annular space, a plurality of pistons which rotate in the same direction noted in the annular space, wherein four of the pistons are mounted in each module, first and second rods diametrically connecting the pistons in pairs and being further propelled by a cyclical speed variation which causes a volume variation in the space delimited by the radial surfaces of the pistons, a first and second shaft which are coaxial wherein the first rod of each module is mounted on the first shaft and the second rod of each module is mounted on the second shaft such that single connecting rod mechanism rotors of the modules have the same angle of clearance and are synchronous.

7 Claims, 8 Drawing Figures

ROTARY ALTERNATING PISTON GAS GENERATOR

BACKGROUND OF THE INVENTION

1. Field of the Invention

The present invention is directed to a variable volume gas generator.

2. Description of the Prior Art

There are two main categories of motors among heat engines, which transform the thermal energy provided by fuel into mechanical energy, continuous flow motors of the gas turbine type, which operate according to the Joule cycle, and volumetric motors wherein compression and expansion are obtained by volume variation and which operate according to the Beau de Rochas (gasoline engines) or Diesel cycle.

None of the motors which fall within these two categories is completely satisfactory insofar as the continuous flow motors have an advantage over the others in that they are lighter, which makes them preferable for use as aircraft engines, but their specific fuel consumption is high, on the order of 200 g per horsepower hour for large gas turbines, a figure which can increase to 300 or more for small gas turbines. Correspondingly, gas and Diesel volumetric motors are heavy and bulky, which is a serious disadvantage but is, in general, acceptable for terrestrial motors because of their low specific fuel consumption (Diesel motors may have specific fuel consumption levels on the order of 150 g per horsepower hour).

The differences in specific fuel consumption between continuous flow and volumetric motors expressed above are based on optimum operating conditions at constant load for both types of machines. These differences are even greater when the motors are operating under a partial load, wherein the specific fuel consumption of continuous flow engines increases rapidly when the load is reduced while, on the contrary, the specific fuel consumption of Diesel engines varies only slightly and may even improve when the load is reduced.

As compared to conventional piston engines, rotary volumetric motors provide a substantial reduction of bulk and mass while retaining the excellent yield provided by the piston engine, and this for the reasons disclosed in French Patent application No. 2,475,126.

This patent application in particular describes rotary volumetric motors including a fixed housing delimiting an annular chamber in which pistons which rotate in the same direction are mounted, such pistons being diametrically connected in pairs by a rod and additionally propelled by a cyclical speed variation causing a volume variation in the space delimited by the radial surfaces of the pistons, and wherein such spaces between the pistons form the chambers of a motor operating on a four stroke cycle.

The annular space in which the piston moves is delimited by the housing and a rotary crown having ports through which the rods are engaged and which provide an angular clearance for the rods enabling the pistons to advance and to recede, such crown forming the engine outlet shaft or being connected to it and being connected by a transmission mechanism to the shafts which are an integral part of the piston rods. However, at high power, for instance at a power greater than 500 hp, this four cycle motor could be advantageously used as a gas generator to be used to charge a self-contained turbine from which the motor effort is taken.

SUMMARY OF THE INVENTION

The objective of the present invention is, therefore, mainly to obtain an improved gas generator in which the volumetric compression ratio is higher than the volumetric expansion ratio.

According to the present invention, the gas generator includes two modules, each forming a heat motor for the production of gas, coupled to a module forming an air compressor which charges the hot compressed gas generating heat motor, such modules including a fixed housing delimiting an annular space in which pistons, which rotate in the same direction, are mounted, and which are diametrically connected in pairs with a rod and additionally propelled by a cyclical speed variation which creates a volume variation in the space delimited by the radial surfaces of the pistons, and wherein one of the rods of each module is mounted on the same shaft, so that the rotors of the modules connected to a single connecting rod assembly mechanism have the same angle of clearance and are synchronous. The central air compressor module operates on a two stroke cycle and the two lateral gas generators, charged with compressed air by the central compressor, operate on a four stroke cycle.

In the configuration according to the invention, exhaust from the lateral modules is directed toward the turbine in which gas expansion may be complete, as opposed to conventional alternating cycle motors.

However, it should be noted that in the device described above, the compressor operates on a two stroke (intake-compression) cycle and is connected to two fourcycle gas generators, so that the compressor alternatively charges the first, then the second gas generator. According to this invention, the gas generator includes a fixed housing in which two modules are positioned symmetrically and along the same axis at 90° angles, each module having a rotary heat engine for the production of hot compressed gas, which is connected to an air compressor charging the hot gas compressor, the modules being connected to each other by a method of transmission to the shafts which are an integral part of the piston rods.

In this other configuration, a two cycle compressor was connected to a four cycle gas generator, and in each module, the two compression phases which occur at the same time charge the same generator simultaneously, rather than alternatively charging one generator, then the other. Similarly, in this particular embodiment, two gas generators positioned at 90° angles on the same shaft are connected, and in this way, there are four elements which include two two-cycle compressors and two fourcycle generators.

Because the gas generator charges a free turbine, the resistant torque is as high as the engine torque. FIG. 6 is a diagram showing the operating cycle of the generator on the abscissa and the engine torque applied to the pinion gears on the ordinate. Sine curve 40 corresponds to one of the gas generators and sine curve 41 corresponds to the other generator. It can be seen that by positioning a gas generator corresponding to curve 40 at a 90° angle to the other generator which corresponds to curve 41, the resulting torque on the pinion gears is zero.

Of course, a greater number of modules may be connected along a same row of shafts; for instance, there may be three modules positioned at 120° angles or four modules at 90° angles. The torque would then be even more regular.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
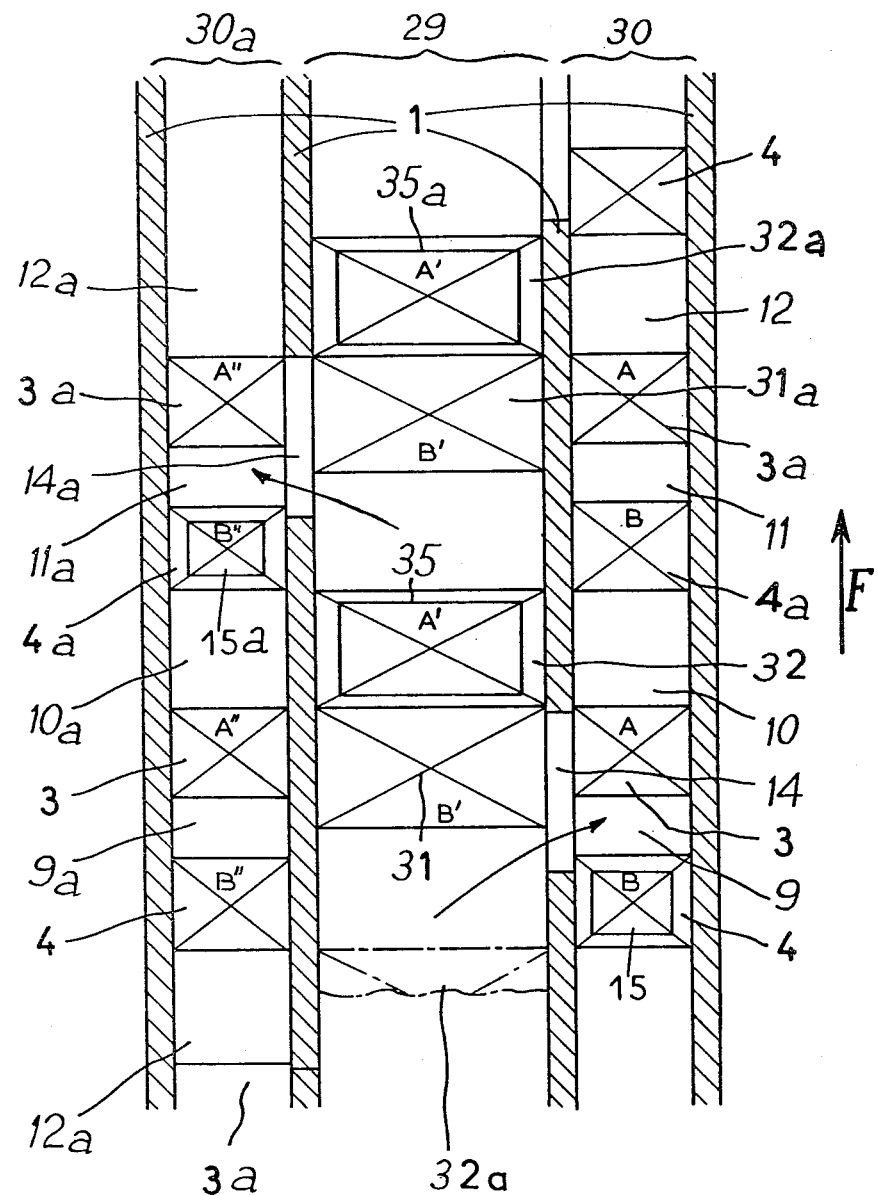
FIG. 1 is a schematic diagram of a preferred embodiment of a variable volume gas generator assembly, wherein the portion of the generator containing the connecting mechanisms is not shown.

FIG. 1 shows a gas generator assembly which includes a central air compressor module 29 positioned between two hot gas generator modules 30, 30a of the rotary volumetric type.

Figure 2:
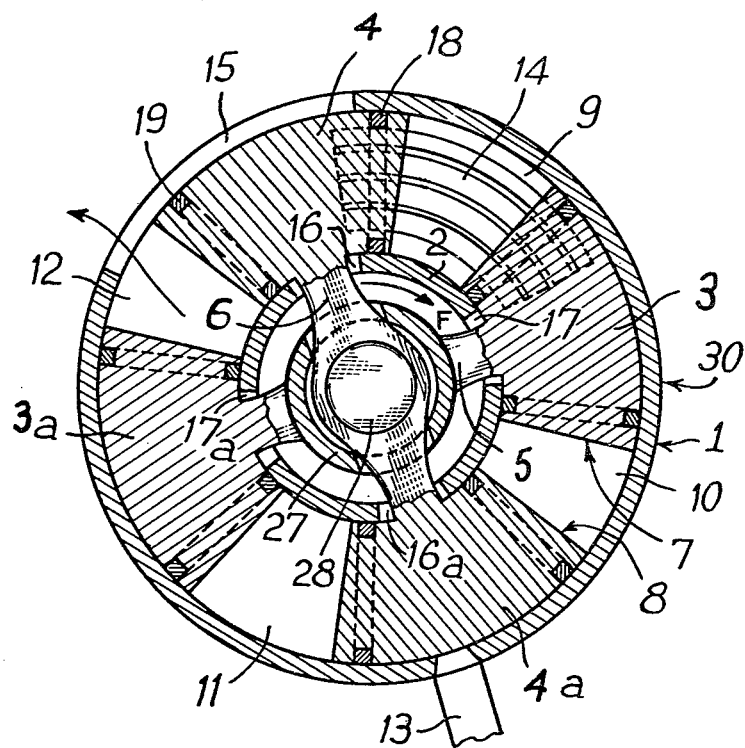
FIG. 2 is a cross-sectional view of one of the lateral hot gas generator modules.
Figure 4:
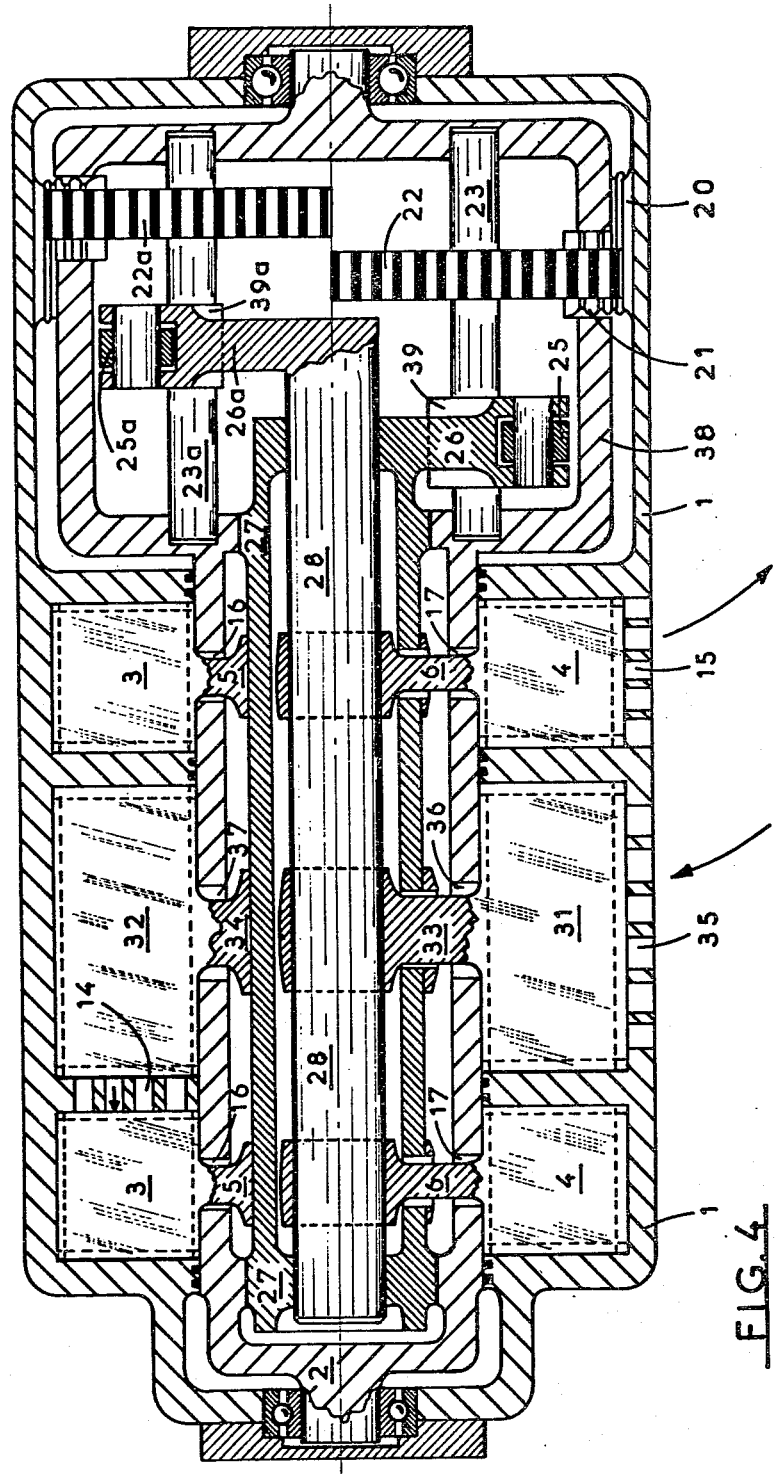
FIG. 4 is a simplified longitudinal sectional view of a preferred embodiment of the variable volume gas generator assembly according to the invention, wherein each sub-assembly is shown on the same plane.

FIG. 2 shows one of the lateral hot gas rotary volumetric generators 30, 30a, which has a fixed exterior housing 1 delimiting an annular space which is closed off on one of the sides by a lid (not shown in the drawing) and on the other side by a wall which separates it from module 29. Housing 1 is represented on the drawings as a single unit for purposes of simplicity, but, of course, it includes a number of parts required for assembly. Inside the housing 1 there is a rotary crown 2 which internally delimits the annular space in which four pistons 3, 3a, 4, 4a rotate in the direction shown by arrow F. Pistons 3 and 3a are symmetrical and connected by a rod 5 and pistons 4 and 4a are connected in the same fashion by a rod 6, as disclosed in detail in the French Patent application cited earlier. The annular space in which the pistons move may have a quadrangular cross-section, as shown in FIG. 4, or it may be circular, for instance, in the simplest cases, or it may have any combination of circle arcs or line segments. The radial surfaces 7, 9 of the adjacent pistons delimit the variable volume spaces 9, 10, 11, 12 between them, which correspond to the chambers of a motor which operates on a four stroke cycle.

The assembly formed by crown 2 and pistons 3, 3a and 4, 4a is propelled along the general rotational direction indicated by arrow F, while pistons 3, 3a and 4, 4a are additionally propelled by a cyclical speed variation corresponding to an acceleration and deceleration of each rod 5, 6, causing pistons 3, 3a and 4, 4a to alternatively advance and recede, so as to produce a cyclical volume variation in spaces or chambers 9, 10, 11, 12, allowing a four stroke cycle to be completed. In the position shown in FIG. 2, chamber 9 is in the intake phase, chamber 10 is in the compression phase, chamber 11 is in the expansion phase and chamber 12 is in the exhaust phase. In this manner, the pressure of the expanding gases in space 11 exerts a force on the adjacent side of piston 4a, the force is directly transferred to the other side of this piston, the latter force being used to compress the combustible mixture for gasoline engines, and the air for Diesel engines, in space 10 where compression occurs. Although the forces on each piston surface are not exactly equal during compression in chamber 10 and expansion in chamber 11 for the duration of this phase of the cycle, the direct transfer of forces substantially reduces the increase in mass which would be needed if the last force had to be carried by the connecting rod and corresponding crankpin, then by crankshaft torsion, by a second crankpin, etc., and then by another connecting rod to the piston in the compression phase, as occurs in alternating piston volumetric motors.

The combustible mixture is ignited when one of the chambers chamber 10 in this case comes opposite the spark plug 13 which is mounted on the housing 1. It should be noted that, for a motor operating on a Diesel cycle, spark plug 13 is replaced by a fuel injector.

The annular space delimited by the housing 1 and the rotary crown 2 has an exhaust port 15 for burnt gases. It is also closed up on the side of module 29 by a wall having a port 14 for intake of the combustible gas mixture in an ignition motor or fresh air in the case of a Diesel motor (see also FIG. 1 for the positions of ports 14, 14a and 15, 15a). So as to provide the angle of clearance of rods 5 and 6 for the pistons to advance and recede, rotary crown 2 includes ports 16, 16a and 17, 17a.

To provide an airtight seal between the fixed exterior housing 1 and the interior rotary crown 2 and the lateral surfaces when they are present, on the one hand, and the pistons 3, 3a and 4, 4a on the other hand, the pistons are fitted with sealing joints such as denoted at 18, 19. FIG. 2 shows a single joint at each extremity of the pistons but, of course, there may be several in a row. In case the housing has a circular section, the joint plane between the fixed housing 1 and the rotary crown 2 is located at the average diameter of the torus. If the housing has a rectangular section, the exterior housing may include three sides and the sealing joint seams are placed in the area where interior rotary crown 2 is connected.

The angle of clearance of the pistons and their extended length are determined by the selection of the volumetric compression ratio to be achieved. One can determine from this the dimensions of ports 16, 16a, 17, 17a in crown 2 needed for piston clearance. The intake and exhaust port may advantageously have an extended length corresponding to the maximum distance between the pistons and the maximum width compatible with the fixed housing.

Figure 3:
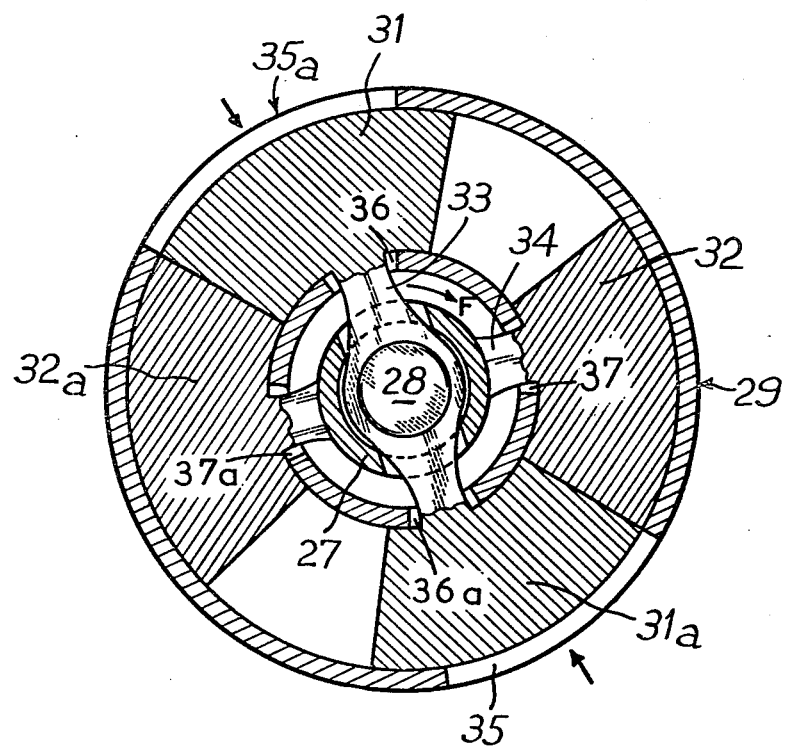
FIG. 3 is a cross-sectional view of the compression module which charges the gas generators.

The central compressor module 29 shown in FIG. 3, which operates on a two stroke cycle, is produced in a fashion which is similar to that of the lateral modules cited above. This module includes two pairs of pistons 31, 31a and 32, 32a which are connected by rods 33 and 34, respectively. The pistons 31, 31a and 32, 32a have the extended length of the quadrant, which is selected so that the adjacent pistons come into contact at the end of the compression phases, making the volume of the chamber nil (contrary to lateral modules 30, 30a, wherein, at the end of the compression and expansion phases, the volume of the chamber is not nil).

Rod 33 is affixed to shaft 28 which already carries the rods 6 of the lateral modules and rod 34 is affixed to shaft 27 which already bears rods 5 of the side modules. In this manner, a single shaft has a rod of each module, and the three rotors thus have the same angle of clearance and are synchronous. In FIG. 1, the letters A, A', A", B, B', B" indicate the pistons which are integrally attached to the same shaft. Similarly, so as to provide the angle of clearance of rods 33 and 34 for the pistons to advance and recede, rotary crown 2 includes ports 36, 36a and 37, 37a.

Figure 5:
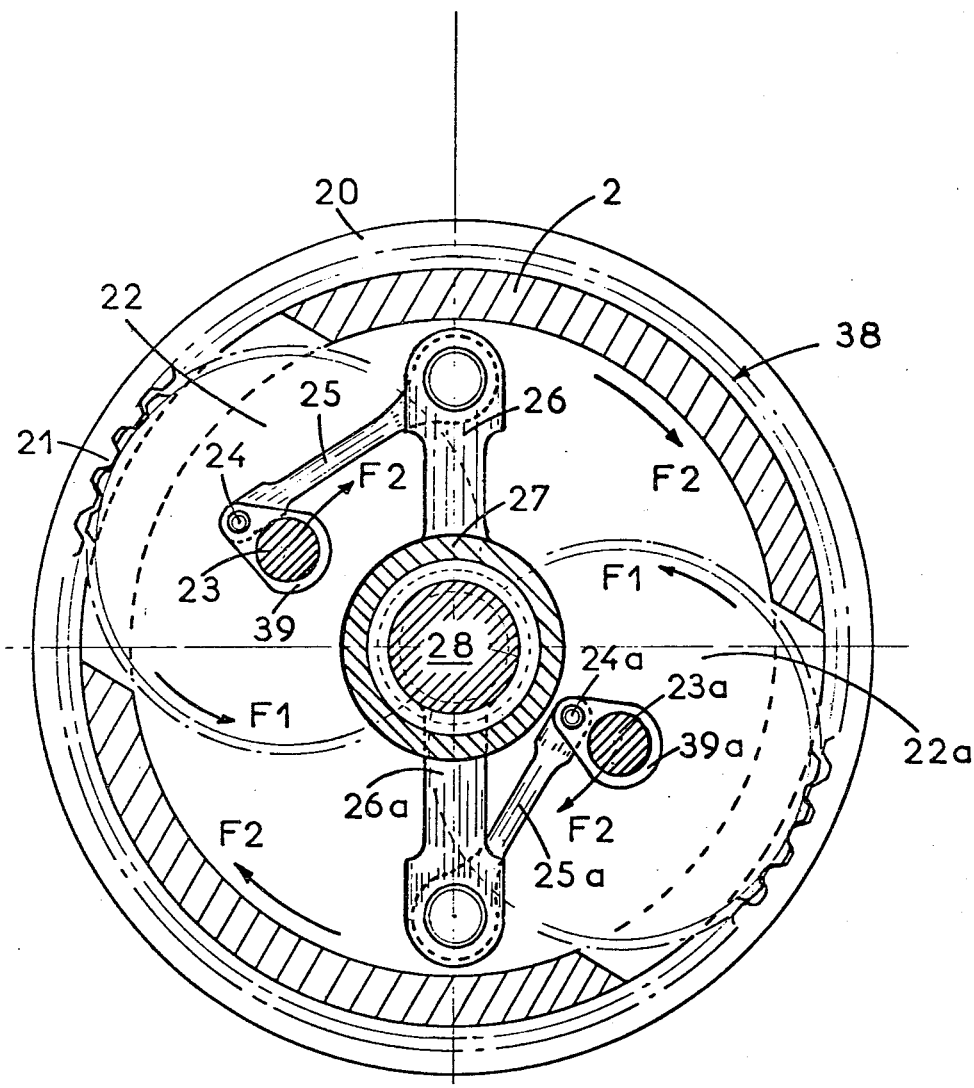
FIG. 5 is a view diagramatically showing the crosswise positioning of the connecting mechanisms between the piston rods.

The central module operates on a two stroke cycle and includes two intake ports 35, 35a and two exhaust ports which correspond to intake ports 14, 14a of the lateral modules (FIGS. 1 and 2). Finally, the connecting rod assembly mechanism shown in FIGS. 4 and 5 is common to the three modules 29, 30, 30a.

This mechanism includes a fixed exterior crown 20 (FIGS. 4 and 5) having interior gear teeth 21, into which two pinion gears 22, 22a mesh, the pinion gears having a total number of teeth equal to half of that of crown 20. These pinion gears 22, 22a are located in different planes and do not mesh with each other. On a squirrel cage 38, which is an integral part of crown 2, there are diametrically opposed axles 23, 23a, onto which rotating pinion gears 22, 22a are mounted and to which is connected by a crankpin 39, 39a an eccentric axle 24, 24a onto which one of the ends of a connecting rod 25, 25a is jointed, with the other end jointed on another crankpin 26, 26a. Crankpins 26, 26a are provided as integral parts of shafts 27, 28, respectively, such shafts having rods 5 and 6 driven by pistons 3, 3a and 4, 4a of the lateral modules, as well as rods 34, 33 which drive pistons 32, 32a, 31, 31a of the central module.

At each active gas ignition or combustion phase during which the pistons recede, each pinion gear 22, 22a is driven by the corresponding connecting rod 25, 25a in the direction of arrow F1. Since the axles of the pinion gears are an integral part of crown 2 and because pinion gears 22, 22a mesh with the fixed exterior crown 20, crown 2 rotates in the direction of arrow F2, therefore in the opposite direction of rotation of pinion gears 22 and 22a. This configuration allows for synchronization of the operation of the pistons, which rotate in the same direction, as indicated by arrow F in FIG. 1.

As can be seen in FIG. 1, pistons 3, 3a and 4, 4a of module 30 are in a position wherein chamber 9 is in the intake phase, chamber 10 is in the compression phase, chamber 11 is in the expansion phase and chamber 12 is in the exhaust phase.

The intake of compressed gases occurs through port 14, while pistons 32a and 31 of the central module 29 advance toward each other and compress the intake air which enters chamber 9 of lateral module 30. On the other hand, pistons 3, 3a and 4, 4a of lateral module 30a are in a position wherein chamber 9a is in the expansion phase, chamber 10a is in the exhaust phase, chamber 11a is in the intake phase, and chamber 12a is in the compression phase.

The intake of compressed gases occurs through port 14a, while pistons 32 and 31a of the central module 29 advance toward each other and compress the intake air which enters chamber 11a of lateral module 30. When they leave exhaust chambers 15, 15a of modules 30, 30a, the hot compressed gases are collected and go to a self-contained power turbine.

The positioning of ports or orifices 14, 14a between the compression chambers of central module 29 and the intake chambers of the lateral modules makes it preferable to use chambers with rectangular sections. Other characteristics and advantages of the invention will become clearer by reading the description of another embodiment of the invention which follows and which is shown in FIG. 7.

In this embodiment, the gas generator includes a fixed housing 1 in which two basic generators are placed, symmetrically and along the same axis, wherein each generator is provided with a rotary heat engine for producing hot compressed gases, the engine being connected to an air compressor which charges it.

Figure 7:
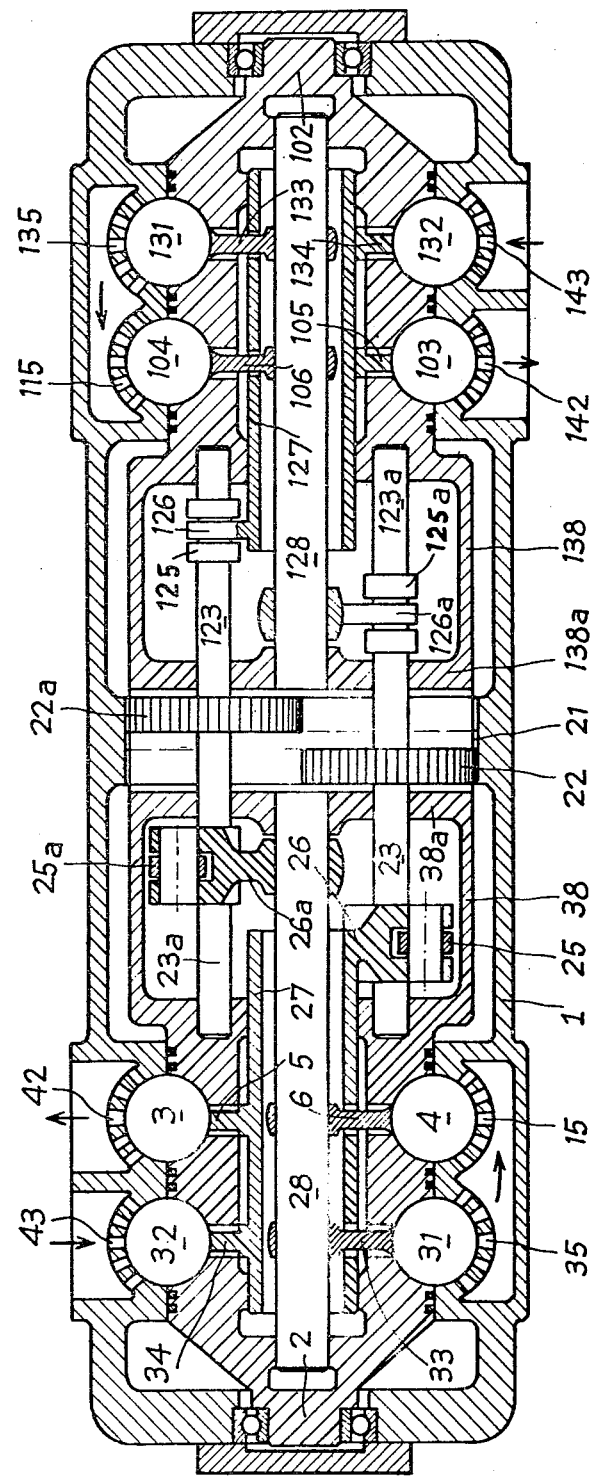
FIG. 7 is a longitudinal sectional view of another embodiment of a gas generator according to the invention and including two modules.
Figure 8:
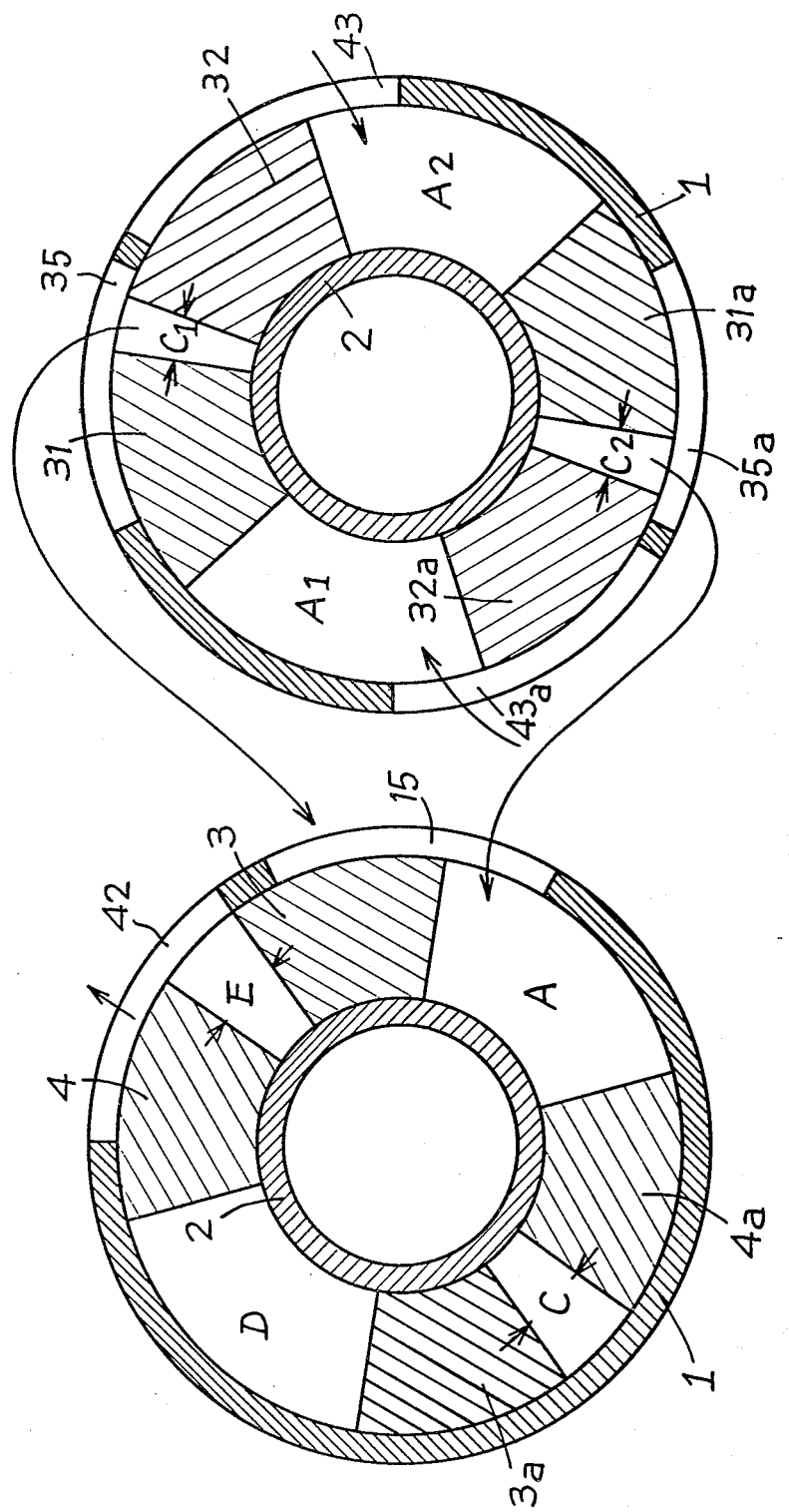
FIG. 8 is a cross-sectional view of a gas generator and compressor.

FIG. 8 shows one of the basic generators of FIG. 7 having a compressor and a heat engine. The compressor including pistons 31, 32, 31a, 32a has two chambers A1, A2 in the intake phase and two chambers C1, C2 in the compression phase. The heat engine including pistons 3, 4, 3a, 4a has chamber A - C - D - E which are in the intake, compression, expansion and exhaust phases, respectively.

The two chambers in the compression phase C1, C2 of each two cycle compressor simultaneously supercharge a chamber A in the intake phase of the four stroke heat engine, while in the preceding configuration, chamber C1 supercharged one of the motors and chamber C2 the other motor.

In connecting the two basic generators shown in FIG. 7, the two pinion gears 22, 22a are common and both connecting rod-crank systems from each generator which propel the same pinion gears are at 90° angles (using the angle of rotation of the pinion gears as the angle of reference).

Figure 6:
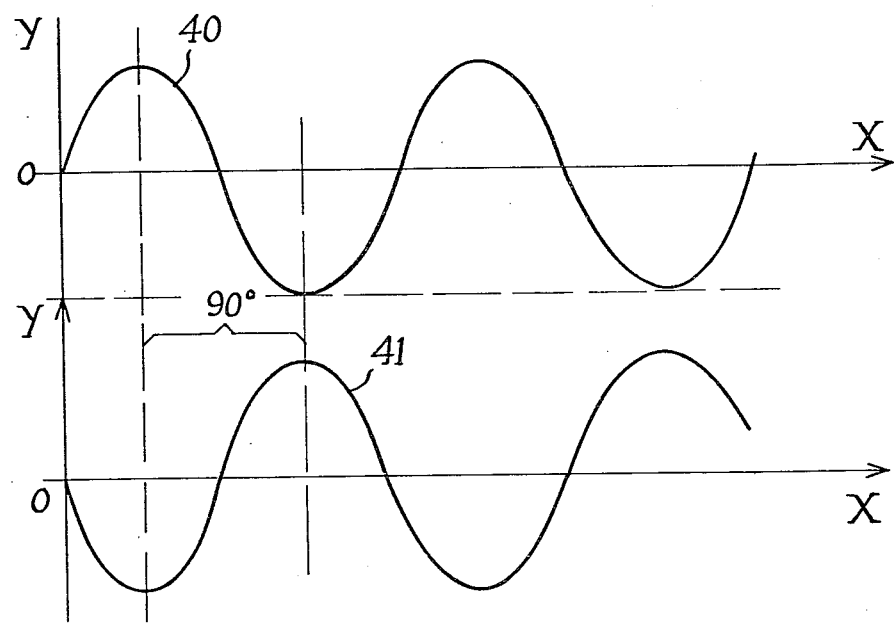
FIG. 6 is a diagram showing the torques of two gas generators as a function of the operating cycle.

The average torque of each basic generator is zero and the resistant torque is as high as the engine torque. FIG. 6 shows a diagram on which the angle of rotation of the pinion gear is shown on the abscissa and the torque applied to the pinion gears is shown on the ordinate. Sine curve 40 corresponds to one of the basic gas generators and sine curve 41 corresponds to the other generator. It can be seen that by placing the gas generator corresponding to curve 40 at a 90° angle in relation the other generator corresponding to curve 41, the resulting torque on the pinion gears is zero. Of course, any number of basic generators may be connected to each side of the device described above, as long as there are even numbers on each side, at 90° angles, charging one or more gas turbines, and the resulting torque on the pinion gears will remain zero.

As the two basic generators are identical, the generator at the right has the same reference numbers as the generator at the left, in 100 series. Each generator is formed of a hot gas generator 3, 4 and 103, 104 connected to an air compressor 31, 32 and 131, 132 which charges the heat engine.

As in the first embodiment, each motor module includes two pairs of pistons (only one piston of which is shown) 3, 4, and 103, 104, radially connected by two rods 5, 6 and 105, 106, and each air compressor has two pairs of pistons (only one of which is shown) 31, 32 and 131, 132 radially connected in pairs by two rods 33, 34 and 133, 134. The pistons move in an annular space delimited by the housing 1 and the rotary crowns 2, 102, which are attached in the central part of the device by squirrel cages 38 and 138 so as to form a single assembly.

In the central part formed by the squirrel cages 38, 138, two rotary shafts 23a, 123 and 23, 123a are mounted, and pinion gears 22a and 22, respectively, are wedged to the shafts, the pinions meshing with crown gear 21 provided in the housing 1. Pinion gears 22, 22a, which are common to both modules, are set between two radial walls 38a, 138a which are part of squirrel cages 38 and 138, respectively. The shaft 23, 123a, which is an integral part of pinion gear 22, is connected on one side by a connecting rod 25 to the crankpin 26 of the exterior shaft 27 on which the rod 5 of the gas generator and the rod of the compressor 34 are wedged, and, on the other side, is connected by a connecting rod 125a to another crankpin 126a of the interior shaft 128 onto which the gas generator rod 106 and the compressor rod 133 are wedged.

Similarly, shaft 23a, 123, which is an integral part of pinion gear 22a, is connected, on one side, by a connecting rod 25a to a crankpin 26a of the interior shaft 28 on which gas generator rod 6 and compressor rod 33 are wedged, and, on the other side, is connected by a connecting rod 125 to a crankpin 126 of the interior shaft 127 onto which gas generator rod 105 and compressor rod 134 are wedged.

Crankpins 26a, which is connected to shaft 23a and crankpin 126, which is connected to shaft 123, which propels pinion gears 22a, are at 90° angles. Similarly, crankpins 26, which is connected to shaft 23 and crankpin 126a, which is connected to shaft 123a, which propels pinion gear 22, are at 90° angles.

As shown in FIG. 7, compressed gases coming from compressor orifice 35, 135 are directed toward intake orifice 15, 115 of the heat engine which also includes an exhaust orifice 42, 142 for the hot gases toward a power turbine (not shown) and the compressor is fitted with intake orifices 43, 143.

As the compressor has two chambers in the intake and exhaust phases for each half-revolution of pinion gear 22, 22a, each pinion gear completes two revolutions while the squirrel cage 38, 138 completes only one revolution. For each revolution of the engine shaft, four cycles are completed. Each basic generator is the equivalent of one four cycle 8 cylinder motor. As the two basic generators are connected to the same squirrel cage 38, 138, the assembly is the equivalent of a four cycle, 16 cylinder motor.

Like the preceding motor, this generator may be supercharged in the same manner as a conventional Diesel engine, wherein the power gathered by the free turbine may be used to drive a small turbocompressor. This gas generator may also be used to form the high pressure component of a small turboreactor.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A variable volume gas generator for charging a self-contained power turbine having heat engines for generating hot compressed gases comprising:

a first and second module each forming a heat motor for the production of the hot compresed gases;

a third module connected to said first and second modules and which forms an air compressor to charge the heat engines, said modules comprising a fixed housing delimiting an annular space;

a plurality of pistons which rotate in the same direction in said annular space, wherein said pistons are mounted in each module;

first and second rods diametrically connecting said pistons in pairs;

a first and second shaft which are coaxial wherein the first rod of each module is mounted on the first shaft and the second rod of each module is mounted on the second shaft and wherein the air compressor module operates on a two stroke cycle and the first and second gas generator modules, which are charged with compressed air from the compressor, operate on a four stroke cycle; and a rotary crown having a plurality of ports through which the rods are disposed, wherein in each module the annular space in which the pistons move is delimited by the housing and the rotary crown, and which provide the angle of clearance for the rods for the pistons to advance and recede, and a transmission mechanism wherein said crown is attached by said transmission mechanism to the shafts and wherein the shafts are in integral part of the piston rods.

2. Gas generator according to claim 1, wherein the transmission mechanism further comprises:

a crankpin;

a connecting rod;

first and second diametrically opposed axles;

first and second rotating pinion gears mounted on said first and second axles;

a fixed exterior crown having interior gear teeth, said pinion gears being staggered longitudinally, and meshing with the interior gear teeth of said fixed exterior crown, each pinion gear having one half the number of gear teeth of the fixed exterior crown and further comprising an axle which is eccentric in relation to its axis of rotation, and on which a first of said connecting rods is joined, the second end of said connecting rod being joined on said crankpin and which is an integral part of one of the first and second shafts.

3. Gas generator according to claim 1, further comprising means forming an airtight seal between the housing and the rotary crown.

4. A variable volume gas generator for charging a self-contained power turbine having heat engines for generating hot compresed gases comprising:

a first and second module each forming a heat motor for the production of the hot compressed gases;

a third module connected to said first and second modules and which forms an air compressor to charge the heat engines, said modules comprising a fixed housing delimiting an annular space;

a plurality of pistons which rotate in the same direction in said annular space, wherein said pistons are mounted in each module;

first and second rods diametrically connecting said pistons in pairs; and a first and second shaft which are coaxial wherein the first rod of each module is mounted on the first shaft and the second rod of each module is mounted on the second shaft, and a rotary crown having a plurality of ports through which the rods are disposed, wherein in each module the annular space in which the pistons move is delimited by the housing and the rotary crown, and which provide the angle of clearance for the rods for the pistons to advance and recede, and a transmission mechanism wherein said crown is attached by said transmission mechanism to the shaft and wherein the shafts are an integral part of the piston rods, wherein the third module further comprises two diametrically opposed air intake ports on the housing, and a port on each lateral surface thereof which separates the third module from the first and second modules, said housing having a plurality of exhaust ports formed therein, and wherein the first and second modules further comprise first and second intake ports which communicate with the lateral surface ports of the third module and exhaust ports which communicate with said exhaust ports formed on the housing, the first and second intake and the exhaust ports having an extended length which corresponds to the maximum distance between the pistons and the maximum width compatible with the housing.

5. A variable volume gas generator for charging a self-contained power turbine having heat engines for generating hot compressed gases comprising:

a first and second module each forming a basic generator for the production of the hot compressed gases, said modules comprising a fixed housing delimiting an annular space and said first and second basic generators, respectively, being positioned symmetrically and along the same axis in said fixed housing, each generator comprising a rotary heat engine for producing hot compressed gases, an air compressor connected to said rotary heat engine which charges the heat engine;

a plurality of pistons which rotate in the same direction in said annular space, wherein said pistons are mounted in each engine and in each compressor;

first and second rods diametrically connecting said pistons in pairs; and a first and second shaft which are coaxial wherein the first rod of each engine and of each compressor is mounted on the first shaft and the second rod of each engine and of each compressor is mounted on the second shaft, wherein said first and second module further comprise a transmission mechanism connecting said basic generators to each other by the first and second shafts and wherein the transmission mechanism between the two basic generators further comprises a crown gear provided in the housing, a first and second rod, a first and second crankpin, and first and second pinion gears, which enmesh with said crown gear provided in the housing, and wherein each of the first and second pinion gears is an integral part of said first rod which is propelled, on one side, by said first crankpin forming an integral part of the first shaft of each generator, on which is mounted one of the first and second rods and, on the other side, connected by said second crankpin which is an integral part of the second shaft onto which the second rod is mounted, connecting one pair of the heat engine and compressor pistons.

6. Gas generator according to claim 5, further comprising a squirrel cage which further comprises an integral part of the crown gear of each basic generator and which is common to the first and second basic generators.

7. Gas generator according to claim 5, wherein the second crankpin is at 90° angle relative to the first crankpin.

* * * * *